June 30, 1925.
J. C. LEHMANN ET AL
1,544,244
COMBINED WIND DEFLECTOR, MIRROR, AND SPOTLIGHT
Filed Aug. 4, 1921
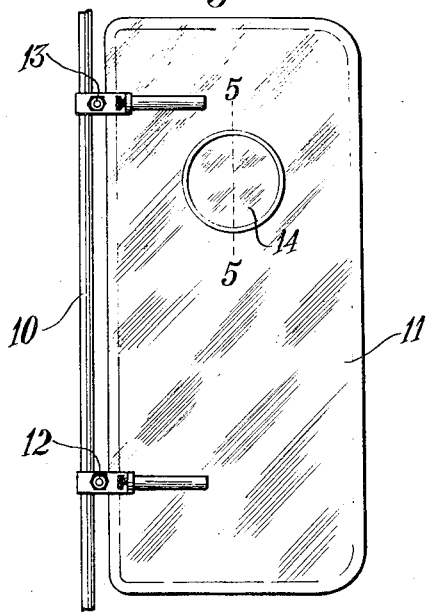
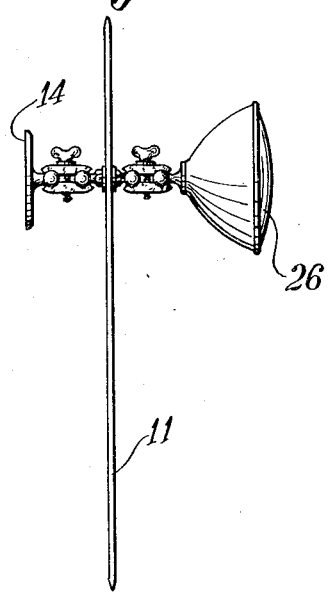
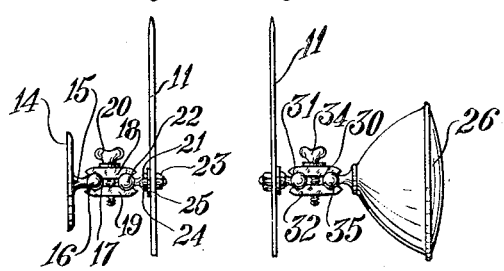
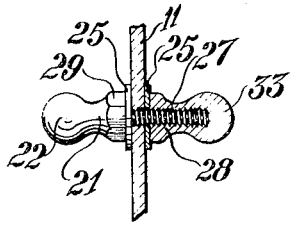
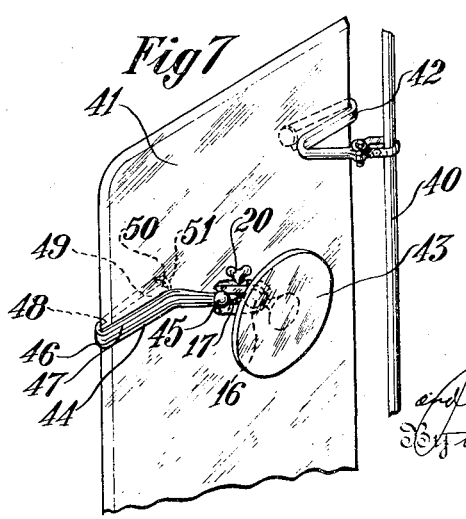
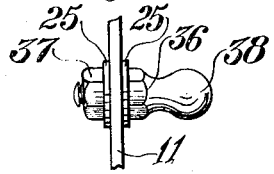

Patented June 30, 1925.

1,544,244

UNITED STATES PATENT OFFICE.

JULIUS C. LEHMANN AND GEORGE H. TIMMERMAN, OF BROOKLYN, NEW YORK, ASSIGNORS TO LEHMANN & CO., A CORPORATION OF NEW YORK.

COMBINED WIND DEFLECTOR, MIRROR, AND SPOTLIGHT.

Application filed August 4, 1921. Serial No. 489,873.

*To all whom it may concern:*

Be it known that we, JULIUS C. LEHMANN and GEORGE H. TIMMERMAN, citizens of the United States of America, residing at city of Brooklyn, county of Kings, State of New York, have invented certain new and useful Improvements in Combined Wind Deflectors, Mirrors, and Spotlights, of which the following is a specification.

This invention relates to common mounting for wind deflectors and a mirror or spot light, or both, for automobiles.

An object of this invention is to provide common mounting means for a side wind deflector and a mirror on an automobile whereby the deflector and the mirror are adjustable for different desired positions relatively to one another and to the automobile.

In accordance with one embodiment of the invention, the wind deflector, usually of glass, is mounted on one side of the automobile by means of an adjustable clamp permitting the wind deflector to be set at the proper angle corresponding to wind or other atmospheric conditions and the mirror is carried by the wind deflector by means of an adjustable clamp secured to the deflector through an opening in the wind deflector. In such construction the mirror is positioned posteriorly of the deflector, and permits the use of a spot-light adjustably mounted anteriorly of the deflector.

In accordance with another embodiment of the invention, the wind deflector is mounted by means of adjustable clamp on a side of the automobile and the mirror is secured to the wind deflector by means of suitable clamps exteriorly embracing the glass deflector and an adjustable element connecting such clamp and the mirror.

Further objects and features of the invention will be more fully understood from the following description and accompanying drawings, in which—

Fig. 1 is a posterior elevational view of a right-hand wind deflector provided with a mirror arranged in accordance with our invention;

Fig. 2 is a side elevation and also showing a spot-light mounted on and extending anteriorly of the side wind deflector;

Fig. 3 is a detail side elevation of Fig. 1, showing the mirror mounted posteriorly of the deflector and without a spot-light;

Fig. 4 is a detail side elevation showing a side wind deflector and a spot-light adjustably mounted thereon and extending anteriorly of the deflector;

Fig. 5 is a detail sectional elevation on line 5—5, showing on an enlarged scale a common support for a mirror and a spotlight;

Fig. 6 is a detail side elevation corresponding to Fig. 5 of a support for a spotlight of the arrangement shown in Fig. 4; and Fig. 7 is a perspective view of a left-hand side wind deflector showing a modification.

Referring to Fig. 1, the post 10 is the usual right-hand front post of an automobile to which the right-hand side wind deflector 11 is secured by means of the pair of adjustable clamps 12, 13, of any approved construction. Preferably, the mirror 14, extending posteriorly of the wind deflector 11, is disposed toward the outer, upper portion of the side wind deflector 11. The side wind deflector 11 is usually made of glass or other suitable transparent, rigid material.

As is indicated in Figs. 2 and 3, the mirror 14 is separate from the material of the side wind deflector 11. As one form of adjustable mounting for the mirror 14, we provide the lug 15 at the rear side of the mirror 14, the free end of the lug 15 having the ball 16 received within the clamp 17 comprising the oppositely disposed clamping members 18 and 19. Each clamping member 18, 19, is provided with oppositely directed spherical sockets for frictionally holding the ball 16 and the winged set screw 20 passes through suitably threaded, centrally located openings in the clamp member 19, for binding the ball 16 within such spherical sockets at any desired position.

Such adjustable clamp 17 is secured to the wind shield 11 by means of the abutment lug 21 provided with the ball 22, similar to the ball 16 and received within spherical sockets at the opposite ends of the clamping members 18, 19, arranged and adjusted similarly as described above. Such abutment lug 21 passes through an opening drilled through the glass plate 11 and is secured therein by means of the outer nut 23 and clamping nut 24, and preferably a cushioning washer 25.

As is indicated in Figs. 2 and 5, such abutment lug 21 may be of double ball construction, for jointly carrying the mirror 14 posteriorly of the deflector 11 and the spot-light 26 anteriorly of the deflector 11. For such use, the threaded stem 27 of the posterior abutment lug 21 is of somewhat greater length and projects within the threaded opening of the anterior lug 28. In this construction the abutment lug 21 is provided with the hexagonal face 29 integral with the body of the lug 21. The washers 25, 25, are disposed respectively between the contacting faces of the lug 21 and the lug 28 and the glass 14.

For mounting the spot-light 26 on the side wind deflector 14, the clamp 30, constructed and arranged similar to the clamp 17, comprises the oppositely disposed clamping members 31, 32, coacting with the ball 33 of the lug 28, and is adjustably secured in position by means of its winged set screw 34 to clamp the ball 33 of the lug 28 and the ball 35 of the spot-light 26 at the desired adjustable position.

In a similar manner, the spot-light 26 may be secured to the wind deflector 14 without a mirror, in which construction as shown in Fig. 6, the lug 36 passes through a perforation in the glass deflector 14 and is clamped by its nut 37. The ball 38 of the lug 36 serves as an abutment for the spot-light.

In the modification shown in Fig. 7, the post 40 represents the left-hand forward vertical post of the automobile to which the left-hand wind deflector 41 is secured by any suitable adjustable clamp or clamps 42. In this modification, the mirror 43 is positioned posteriorly of the side wind deflector 41 and is mounted for adjustability of position independently of the adjustment of the wind deflector 41. As one means of such arrangement, we have shown the clamp 17 corresponding to the aforesaid clamp 17 illustrated in Fig. 3 and like parts are indicated by the same reference characters.

To support the mirror, 43, on the side wind deflector 41, we provide the clamping arm 44, having the ball end 45 received within the clamp 17, and upon fastening the winged set screw 20 of the clamp 17, the ball 16 of the mirror 43 and the ball 45 of the clamp 44 are locked in adjustable position.

The clamp 44 is formed of the arm 46 of a fixed acute angle, comprising the intermediate clamp to directly clamp one face of the glass deflector, or as preferred by means of a rubber strip interposed between the inner face of the intermediate clamp 47 and the face of the glass, to cushion the same; and comprises also the terminal portion 48 extending at an acute angle away from the opposite face of the glass deflector 14 and between the inner face of the terminal portion 48 and the opposite face of the glass deflector 41, is disposed the adjustable wedge member 49 adjusted and held in position by the set-screw 50, having the knurled head 51, the inner face of which directly engages the wedge 49 for holding the clamp 44 in position on the deflector. As preferred, a rubber strip or like cushioning material is interposed between the engaging face of the wedge 40 and the face of the wind deflector 41.

By such construction, as indicated in Fig. 7, the mirror may be located at any vertical position on the wind deflector and obviates the boring of any perforation in the deflector.

It will be noted that in the use of the spot-light pursuant to our invention, the spot-light for the different positions of adjustment vertically and horizontally is located in substantial alignment with the mirror for the different positions of adjustment of the mirror, whereby the employment to both the spot-light and the mirror on the side wind deflector does not restrict the vision afforded to the driver through the transparent material of the side wind deflector.

Whereas we have described our invention by reference to specific forms thereof, it will be understood that many changes and modifications may be made without departing from the spirit of the invention, as defined by the appended claims.

We claim:

1. A support for a mirror and a spot light or the like on opposite sides of a sheet of transparent material, said sheet of transparent material being provided with an opening, said support comprising a pair of adjustable supporting members, each comprising a fixed element and a relatively movable element, common means passing through the opening in the sheet of transparent material connecting said fixed elements to one another and means arranged to be positioned on opposite sides of the sheet of transparent material for securing said common means to extend on opposite sides of the sheet of transparent material.

2. A support for a mirror and a spot light or the like, a sheet of transparent material, said support comprising a pair of adjustable supporting members, each comprising a ball and socket, common means constructed to extend on opposite sides of the sheet of transparent material and fixedly connecting one element of each of said ball and socket members to one another and means for rigidly securing said common means to the sheet of transparent material.

3. A support for a mirror and a spot light or the like on opposite sides of a sheet of transparent material, said sheet of transparent material being provided with an opening, said support comprising a pair of adjustable ball and socket members, a threaded stud extending through the opening in the sheet of transparent material and fixedly connecting an element of each of said adjustable ball and socket members and separately adjustable means arranged to be positioned on opposite sides of the sheet of transparent material for securing said threaded stud to the sheet of transparent material.

In testimony whereof we have signed this specification this 31st day of May, 1921.

JULIUS C. LEHMANN.
GEO. H. TIMMERMAN.